United States Patent Office 3,755,477
Patented Aug. 28, 1973

3,755,477
PROCESS FOR PRODUCING FLUORINATED HYDROCARBONS
Richard Andrew Firth and George Edward Foll, Runcorn, England, assignors to Imperial Chemical Industries Limited, London, England
No Drawing. Filed June 22, 1970, Ser. No. 48,497
Claims priority, application Great Britain, Feb. 26, 1969, 32,543/69
Int. Cl. C07c 17/08, 17/20
U.S. Cl. 260—653.4
15 Claims

ABSTRACT OF THE DISCLOSURE

An improved chromia catalyst for fluorination of halogenated hydrocarbons is prepared by treating a chromium hydroxide paste with water or steam before being dried and calcined.

---

This invention relates to catalysts, more particularly chromium oxide catalysts, which are useful in the manufacture of chlorofluoroalkanes.

Chromium oxide catalysts are well known for use in the manufacture of halofluorohydrocarbons by fluorination of a corresponding halohydrocarbon. Such catalysts are described for instance in our U.K. Pat. No. 976,883.

We have now found that a chromium oxide catalyst for fluorination reactions can be prepared by a process in which a chromium hydroxide paste is treated with water to improve its catalytic activity.

Thus according to the invention there is provided a process for preparing a chromium oxide catalyst suitable for use in fluorination reaction which comprises preparing a precipitate of chromium hydroxide from an aqueous solution of trivalent chromium salt with a suitable base, filtering the precipitate to obtain a chromium hydroxide paste, treating the paste with water at a temperature of at least 40° C. and then calcining the product.

The term "chromium hydroxide" is well known in the art and includes any hydrated chromia obtained by precipitation from a trivalent chromium salt with a suitable base.

The water treatment may be carried out in any suitable manner. Thus, for instance, the paste may be placed in a vessel and covered with a layer of water which may then be decanted off after completion of the treatment. However it is preferred that the paste is treated with an atmosphere of steam and the description that follows is with reference to this method although the conditions given, where they are applicable, will also relate to the liquid water treatment.

The steam treatment may suitably be carried out by drying the paste in a closed vessel or a vessel from which only a small quantity of gas can escape whereby the steam generated from the paste provides the necessary atmosphere. If desired steam may also be added from an extraneous source.

Alternatively, the paste may be placed in a drying oven having a steam inlet and outlet and steam passed into the oven. Preferably, the steam is maintained at slightly above atmospheric pressure within the oven, although atmospheric or subatmospheric pressures may be used. Suitably the paste may be treated by placing in trays for example to depth of 0.5 to 2.5 cm.

It is desired that during the steam treatment the atmosphere surrounding the chromium hydroxide is maintained at a humidity such that it comprises from 10 to 100 weight percent of water. Suitably the treatment is carried out at least an hour, for example 2 to 36 hours. Generally the temperature of the atmosphere will be from 50 to 180° C., preferably 50° C. to 120° C.

The catalyst is then calcined at a temperature of, for example 250° C. to 400° C., preferably 320° C. to 360° C. Calcination is usually carried out for at least 1 hour, for example 2 to 24 hours, preferably 14 to 18 hours.

Generally after the steam treatment but before the calcination, the chromium hydroxide is dried in the absence of steam, for example at a temperature of 50° C. to 150° C., preferably 50° C. to 120° C. This drying is usually carried out for at least 1 hour, for example 2 to 36 hours.

The catalyst may then be compressed into pellets. A small proportion, e.g. up to 5% by weight, of a lubricating material, such as graphite may be added to assist in the pelleting. The pellets are usually formed by compressing using conventional techniques.

The chromium hydroxide paste is usually obtained by conventional means, for example by precipitation from an aqueous solution of a trivalent chromium salt, such as chromium chloride or nitrate, using a suitable base, such as an alkali metal hydroxide or ammonium hydroxide. The precipitated hydroxide is then filtered off, washed with water and the paste remaining treated according to the invention.

According to the invention there is also provided a process for producing fluorinated hydrocarbons which comprises fluorinating a halogenated aliphatic hydrocarbon containing at least one halogen atom other than fluorine by reaction in the gas phase with hydrogen fluoride in the presence of the chromium oxide catalyst of the invention.

If desired a halogen, usually chlorine, may be present as one of the reactants, especially if the halogenated hydrocarbon contains an unsaturated bond, such as perchloroethylene.

The halogenated hydrocarbons which can be fluorinated according to the invention are usually those containing 1 to 8 carbon atoms. They may include saturated compounds which contain chlorine as the only halogen, for example chloromethanes such as carbon tetrachloride, chloroethanes such as ethyl chloride, 1,1- and 1,2-dichloroethane, 1,1,1 - trichloroethane and hexachloroethane; saturated compounds which contain bromine as the only halogen, for example bromomethanes and bromoethanes; saturated compounds which contain both bromine and chlorine, for example bromochloromethanes and ethanes; saturated compounds which contain fluoride and at least one other halogen, for example chlorofluoromethanes, ethanes and propanes; bromofluoromethanes, ethanes and propanes; and bromochlorofluoromethanes, ethanes and propanes. Other suitable halogenated hydrocarbons are halogenated olefines which contain at least one halogen other than fluorine, with or without fluorine being present, for example chloroethylenes, such as trichloroethylene, perchloroethylene, vinyl chloride, vinylidene chloride, cis- and trans-1,2-dichloroethylene, propylenes and butylenes; bromoethylenes, propylenes and butylenes; bromochloroethylenes, propylenes and butylenes; chlorofluoroethylenes, propylenes and butylenes; and bromofluoroethylenes, propylenes and butylenes. Halogenated cycloalkanes and cycloalkenes containing at least one halogen other than fluorine may also be treated according to the invention as well as phenyl, halophenyl and haloalkylphenyl substituted haloalkanes, for example benzyl chloride, benzal chloride, benzotrichloride and benzyl bromide.

The temperature at which the halogenated hydrocarbons are fluorinated should be sufficiently high for the reactants to be in the vapour phase and may be in the range 65° C. to 600° C., for example 130° C. to 475° C., preferably 275° C. to 425° C., especially 275° C. to 325° C.

Generally the catalyst will be given a prefluorination treatment, usually lasting for at least 30 minutes, before being used in the fluorination reaction. This is conveniently carried out by passing hydrogen fluoride gas over the catalyst at a temperature of for example 250° C. to 400° C.

The ratio of hydrogen fluoride to halogenated hydrocarbon is not critical but it is desirable that the halogenated hydrocarbon is mixed with at least one mole of hydrogen fluoride for each gram atom of halogen to be replaced in the halogenated hydrocarbon.

It is desirable that the reaction conditions be adjusted so that reactants have a contact time with catalyst of 2 to 25 seconds, preferably 4 to 8 seconds.

The invention is illustrated in the following examples:

EXAMPLE 1

Ammonia solution (7.5 M) was mixed with an aqueous solution of chromic nitrate (2.5 M) with continuous stirring. The precipitate was filtered off and washed with water until free from ammonium nitrate to give a paste of hydrous chromic oxide ("chromium hydroxide") containing about 20% solids, calculated as $Cr_2O_3$.

The paste was treated for 24 hours at a temperature of 50° C. to 90° C. in an oven through which steam at atmospheric pressure was passed, and then for another 24 hours at the same temperature in the absence of steam. The dried chromium oxide was then calcined at a temperature of about 300° C. for approximately 16 hours and then formed into pellets.

For the purposes of comparison, catalyst was similarly prepared in which the treatment was omitted.

The catalysts were then used in the fluorination of 1,1,2-trichloro-1,2,2-trifluoroethane as follows:

Catalyst (120 g.) was prefluorinated in a 2.5 cm. diameter Inconel reactor by passing hydrogen fluoride gas (approx. 20 g.) over the heated catalyst for 1 hour. Hydrogen fluoride gas was then mixed with vaporised 1,1,2-trichloro-1,2,2-trifluoroethane in a mole ratio of 2:1, and the mixture passed over the catalyst with a contact time of 5 seconds. The effluent products were scrubbed with water and then sodium hydroxide, dried over calcium chloride and analysed by vapour-phase chromatography. The average conversion of reactants to dichlorotetrafluoroethane and chloropentafluoroethane over a period of 5 hours was measured.

The results of 8 experiments are shown in Table I.

TABLE I

| Experiment No. | 1 | 2 | 3 | 4 | 5 | 6 | 7 | 8 |
|---|---|---|---|---|---|---|---|---|
| Steam treatment | Yes | No | Yes | No | Yes | No | Yes | No |
| Prefluorination temp. (° C.) | 350 | 350 | 250 | 250 | 350 | 350 | 250 | 250 |
| Fluorination temp. (° C.) | 300 | 300 | 300 | 300 | 375 | 375 | 375 | 375 |
| Conversion to tetrafluorodichloro and pentafluorochloroethanes (percent) | 80 | 64 | 77 | 28 | 90 | 88 | 83 | 70 |
| Conversion of trichlorotrifluoroethane (percent) | 97 | 72 | 86 | 35 | 97 | 93 | 91 | 84 |

In all cases it will be seen that the catalyst of the invention which had been treated with steam resulted in better conversions than when a catalyst was used in which the steam treatment was omitted.

EXAMPLE 2

Hydrous chromic oxide paste, prepared as in Example 1, was treated in an atmosphere containing steam and then dried in air. The dried products (60–75% $Cr_2O_3$) were calcined in air at 340° C. for 16 hours and formed into pellets. They were tested for catalytic activity as in Example 1, using a prefluorination temperature of 350° C. and a reaction temperature of 300° C. The results of using catalysts, prepared under three different sets of conditions, are given in Table II.

TABLE II

| Catalyst | 1 | 2 | 3 |
|---|---|---|---|
| Temperature of steam treatment (° C.) | 95 | 95 | 80 |
| Time of steam treatment (hours) | 12 | 24 | 24 |
| Amount of water in steam treatment atmosphere (vol. percent) | 42 | 60 | 33 |
| Temperature of air drying (° C.) | 140 | 90 | 80 |
| Conversion to 1,1,2,2-tetrafluorodichloroethane (percent) | 52 | 55 | 47 |
| Conversion to 1,1,1,2-tetrafluoro dichloroethane (percent) | 5 | 4 | 7 |
| Conversion to pentafluorochloroethane (percent) | 29 | 26 | 23 |

EXAMPLE 3

A 2.5 cm. diameter nickel tube was charged with 150 g. of catalyst No. 2 of Example 2 to give a bed depth of approximately 25 cm. The catalyst bed was heated to the desired temperature under a dry nitrogen atmosphere. Whilst maintaining this temperature, a mixture of vinylidene chloride and hydrogen fluoride was fed into the reactor. The effluent products obtained were treated and analysed as described in Example 1.

The conditions and results of 7 runs are shown in Table III.

TABLE III

| Run | Vinylidene chloride feed rate (moles/hour) | Hydrogen fluoride feed rate (moles/hour) | Mole ratio of hydrogen fluoride/vinylidene chloride | Contact time (secs.) | Temp. of catalyst (° C.) | Composition of product (percent) | | |
|---|---|---|---|---|---|---|---|---|
| | | | | | | $CH_3CFCl_2$ | $CH_3CF_2Cl$ | $CH_3CF_3$ |
| 1 | 0.35 | 0.9 | 2.6 | 15.2 | 70–80 | 43 | 45 | 7 |
| 2 | 0.3 | 1.05 | 3.5 | 13.4 | 75–85 | 38 | 51 | 9 |
| 3 | 0.49 | 1.56 | 3.2 | 8.7 | 90–100 | 26 | 63 | 10 |
| 4 | 0.29 | 0.66 | 2.3 | 18.8 | 90–100 | 24 | 48 | 25 |
| 5 | 0.41 | 1.9 | 4.6 | 7.1 | 120–130 | | 16 | 83 |
| 6 | 0.41 | 1.82 | 4.4 | 6.9 | 140–165 | | 2 | 97 |
| 7 | 0.42 | 1.8 | 4.3 | 5.7 | 250–265 | | 1 | 98 |

EXAMPLES 4 TO 25

Example 3 was repeated with various halogenated hydrocarbons. The reactants, conditions and results are shown in Table IV.

TABLE IV

| Ex. No. | Halogenated hydrocarbon | Halogenated hydrocarbon feed rate (moles/ hour) | Hydrogen fluoride feed rate (moles/ hour) | Mole ratio of hydrogen fluoride/ halogenated hydrocarbon | Contact time (secs.) | Temp. of catalyst (° C.) | Composition of products |
|---|---|---|---|---|---|---|---|
| 4 | $CF_2ClCFCl_2$ | 0.33 | 3.0 | 10 | 2.8 | 435 | $CF_2ClF_2Cl$ (7%), $CF_3CF_2Cl$ (46%), $CF_3CF_3$ (47%). |
| 5 | $CF_2ClCFCl_2$ | 0.1 | 1.0 | 10 | 7.2 | 560 | $CF_3CF_2Cl$ (5%), $CF_3CF_3$ (95%). |
| 6 | $CF_3CCl_3$ | 0.8 | 2.6 | 3.3 | 2.9 | 300 | $CF_3CFCl_2$ (80%). |
| 7 | $CF_2BrCF_2Br$ | 0.75 | 2.8 | 3.7 | 4.6 | 300 | $CF_3CF_2Br$ (70%). |
| 8 | $CF_2ClCF_2Cl$ | 0.9 | 2.1 | 2.3 | 3.8 | 300 | $CF_3CF_2Cl$ (60%), $CF_3CF_3$ (10%). |
| 9 | $CH_3Cl$ | 1.25 | 1.75 | 1.4 | 3.7 | 320 | $CH_3F$ (5%). |
| 10 | $CH_2Cl_2$ | 1.2 | 1.75 | 1.5 | 3.8 | 320 | $CH_2F_2$ (33%), $CH_2ClF$ (18.7%). |
| 11 | $CHCl_3$ | 0.95 | 1.75 | 1.8 | 4.1 | 320 | $CHF_3$ (37.2%), $CHF_2Cl$ (23.1%), $CHFCl_2$ (18.8%). |
| 12 | $CCl_4$ | 0.78 | 1.75 | 2.2 | 4.4 | 320 | $CF_3Cl$ (5%), $CF_2Cl_2$ (80%), $CFCl_3$ (5%). |
| 13 | $CHBr_3$ | 0.23 | 1.75 | 7.6 | 5.9 | 290 | $CHF_3$ (98%). |
| 14 | $CH_3CH_2Cl$ | 0.75 | 1.5 | 2.0 | 5.6 | 250 | $CH_2=CH_2$ (90%), $CH_3CH_2F$ (7%). |
| 15 | $CH_2ClCH_2Cl$ | 0.55 | 2.2 | 4.0 | 4.8 | 280 | $CH_3CHF_2$ (20%), $CF_3CH_2Cl$ (30%). |
| 16 | $CH_3CCl_3$ | 0.42 | 2.3 | 5.5 | 6.5 | 100 | $CF_3CH_3$ (5%), $CF_2ClCH_3$ (15%), $CFCl_2CH_3$ (80%). |
| 17 | $CH_3CCl_3$ | 0.42 | 2.1 | 5.0 | 6.1 | 160 | $CF_3CH_3$ (25%), $CF_2ClCH_3$ (50%), $CFCl_2CH_3$ (25%). |
| 18 | $CH_3CCl_3$ | 0.64 | 3.2 | 5.0 | 3.1 | 280 | $CF_3CH_3$ (95%). |
| 19 | $CHCl_2CHCl_2$ | 0.45 | 2.7 | 6.0 | 3.9 | 270 | $CF_3CH_2Cl$ (90%). |
| 20 | $CH_2=CHCl$ | 1.2 | 1.75 | 1.5 | 3.8 | 320 | $CH_2=CHF$ (20%), $CH_3CHF_2$ (22%). |
| 21 | $CHCl=CHCl$ | 0.6 | 1.75 | 2.9 | 5.1 | 280 | $CH_3CF_2Cl$ (10%), $CHF=CHCl$ (5%). |
| 22 | $CHCl=CCl_2$ | 0.45 | 2.8 | 6.2 | 3.6 | 290 | $CF_3CH_2Cl$ (85%). |
| 23 | $CCl_2=CCl_2$ | 0.175 | 1.75 | 10.0 | 5.4 | 360 | $CF_3CF_2H$ (30%), $CF_3CF_2Cl$ (20%), $CF_3CFClH$ (20%), $CF_3CCl_2H$ (20%). |
| 24 | $CF_2=CFCl$ | 0.97 | 1.75 | 1.8 | 4.0 | 320 | $CF_2=CF_2$ (20%), $CF_3CFHCl$ (13%). |
| 25 | $CF_3CHCl_2$ | 0.185 | 1.75 | 9.5 | 4.5 | 390 | $CF_3CF_2H$ (67%), $CF_3CFHCl$ (21%), $CF_2CF_2Cl$ (2.5%). |

We claim:

1. A process for producing fluorinated aliphatic hydrocarbons which comprises fluorinating a halogenated aliphatic hydrocarbon selected from the group consisting of halogenated alkanes and halogenated alkenes containing at least 1 halogen atom other than fluorine by reaction in the gas phase with hydrogen fluoride in the presence of a chromium oxide catalyst prepared by precipitating chromium hydroxide from an aqueous solution of trivalent chromium salt with a suitable base, filtering the precipitate, washing the precipitate to obtain a chromium hydroxide paste, treating the paste in an atmosphere comprising 10 to 100 percent by weight of steam at a temperature of 50° C. to 180° C. for at least one hour, drying the paste in the absence of added steam at a temperature of 50° C. to 150° C. and calcining the product at a temperature of 250° C. to 400° C. for at least one hour.

2. A process according to claim 1 in which the halogenated hydrocarbon is fluorinated at a temperature of 65° C. to 600° C.

3. A process according to claim 2 in which the temperature is 130° C. to 475° C.

4. A process according to claim 3 in which the temperature is 275° C. to 425° C.

5. A process according to claim 1 in which before the fluorination reaction, the catalyst is given a prefluorination treatment by passing hydrogen fluoride gas over it.

6. A process according to claim 5 in which the prefluorination treatment is carried out for at least 30 minutes, at 250° C. to 400° C.

7. A process according to claim 1 in which the halogenated hydrocarbon is mixed with at least 1 mole of hydrogen fluoride for each gram atom of halogen to be replaced in the halogenated hydrocarbon.

8. A process according to claim 1 in which the reaction conditions are adjusted so that the reactants have a contact time with the catalyst of 2 to 25 seconds.

9. A process according to claim 1 in which the halogenated hydrocarbon is one containing 1 to 8 carbon atoms.

10. A process according to claim 9 in which the halogenated hydrocarbon contains an unsaturated bond.

11. A process according to claim 10 in which a halogen is present as one of the reactants.

12. A process according to claim 11 in which the halogen is chlorine.

13. A process according to claim 10 in which the halogenated hydrocarbon is a chlorinated ethylene.

14. A process according to claim 13 in which the chlorinated ethylene is selected from the group consisting of perchloroethylene, vinyl chloride and vinylidene chloride.

15. Process according to claim 1 wherein the step of washing the precipitate is carried out with water.

References Cited

UNITED STATES PATENTS 3,235,212   2/1966   Anello et al. _____ 260—653.7
3,258,500   6/1966   Swamer et al. _____ 260—653.7

FOREIGN PATENTS 546,962   10/1957   Canada _____ 260—653.7

DANIEL D. HORWITZ, Primary Examiner

U.S. Cl. X.R.

252—441, 467; 260—648 F, 651 F, 650 F, 653.4, 653.3, 653.7